United States Patent [19]
Pawlicki et al.

[11] Patent Number: 5,186,644
[45] Date of Patent: Feb. 16, 1993

[54] ELECTRICAL CONNECTOR SYSTEM

[75] Inventors: Jeffrey J. Pawlicki, Downers Grove; Timothy R. Ponn, Aurora; Thomas G. Premo, West Chicago, all of Ill.

[73] Assignee: Molex Incorporated, Lisle, Ill.

[21] Appl. No.: 884,267

[22] Filed: May 8, 1992

Related U.S. Application Data

[63] Continuation of Ser. No. 668,643, Mar. 13, 1991, abandoned.

[51] Int. Cl.⁵ .......................................... H01R 33/00
[52] U.S. Cl. .................................. 439/353; 439/271; 439/736; 439/34
[58] Field of Search ................. 439/34, 350, 353, 358, 439/271, 465, 467, 736

[56] References Cited

U.S. PATENT DOCUMENTS

| | | | |
|---|---|---|---|
| 3,517,381 | 6/1970 | Kozicki | 439/34 |
| 3,594,696 | 7/1971 | Witek, Jr. | 439/736 |
| 3,699,498 | 10/1972 | Hardesty et al. | 439/345 |
| 4,072,381 | 2/1978 | Burkhart et al. | 439/736 |
| 4,637,674 | 1/1987 | Kobler | 439/271 |
| 4,789,343 | 12/1988 | Dougherty et al. | 439/34 |

Primary Examiner—Larry I. Schwartz
Assistant Examiner—Hien D. Vu
Attorney, Agent, or Firm—A. A. Tirva

[57] ABSTRACT

An electrical connector assembly is disclosed, particularly adapted for connecting an electronic control system to an adjustable automotive suspension component. The assembly includes a dielectric housing having terminals for connection to appropriate mating terminals on the suspension component. A separate dielectric latch is ultrasonically welded to the dielectric housing for latching the connector assembly to a complementary latch on the suspension component. The housing has a base and a receptacle projecting from the base. The separate latch has a shroud ultrasonically welded about the receptacle of the housing. The terminals are insert molded in the housing. The terminals are generally L-shaped with one leg of each terminal completely insert molded in the base, including its termination with an appropriate electrical wire, and the other leg of each L-shaped terminal defines its contact portion extending into the receptacle of the housing.

6 Claims, 2 Drawing Sheets

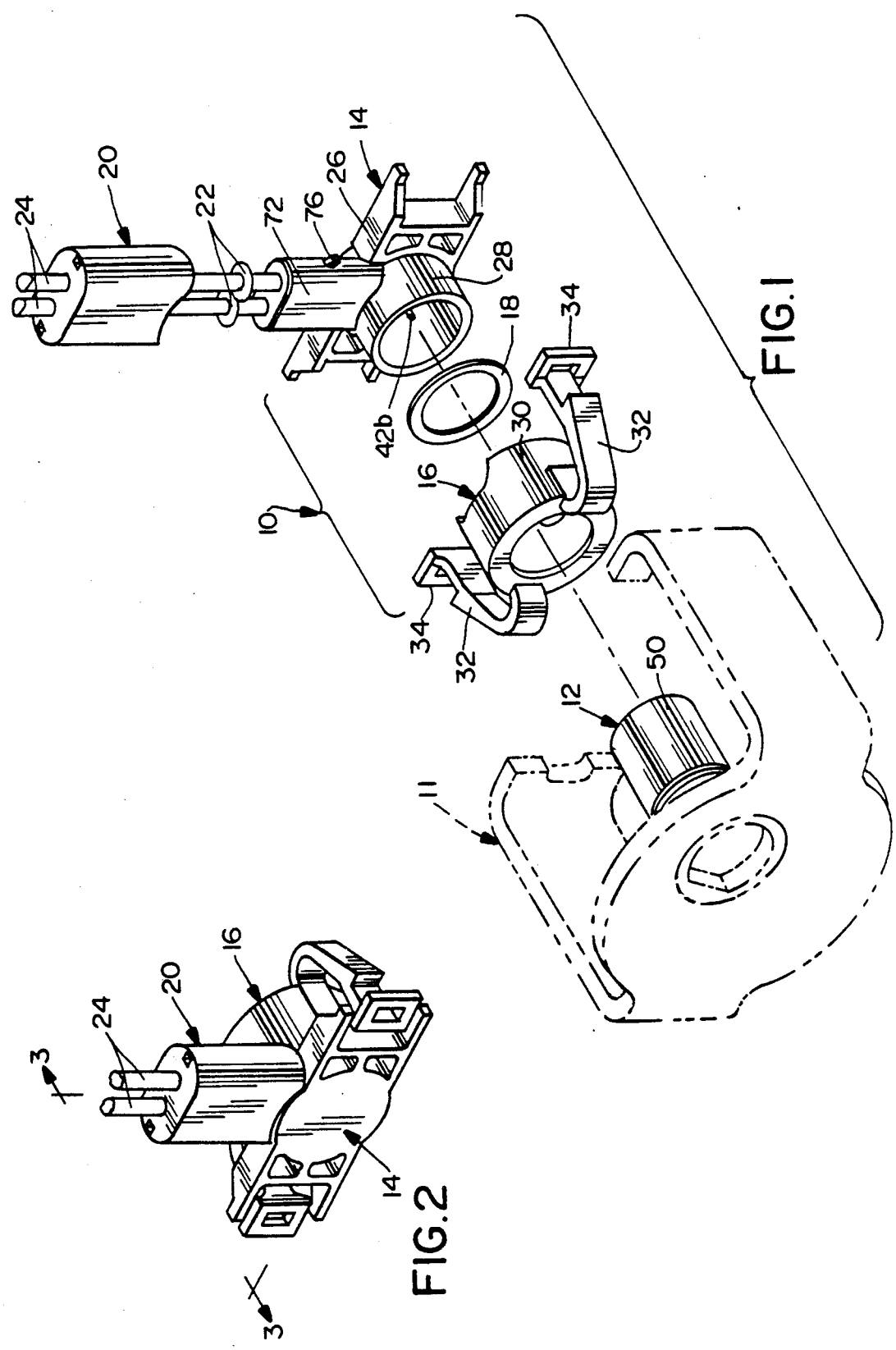

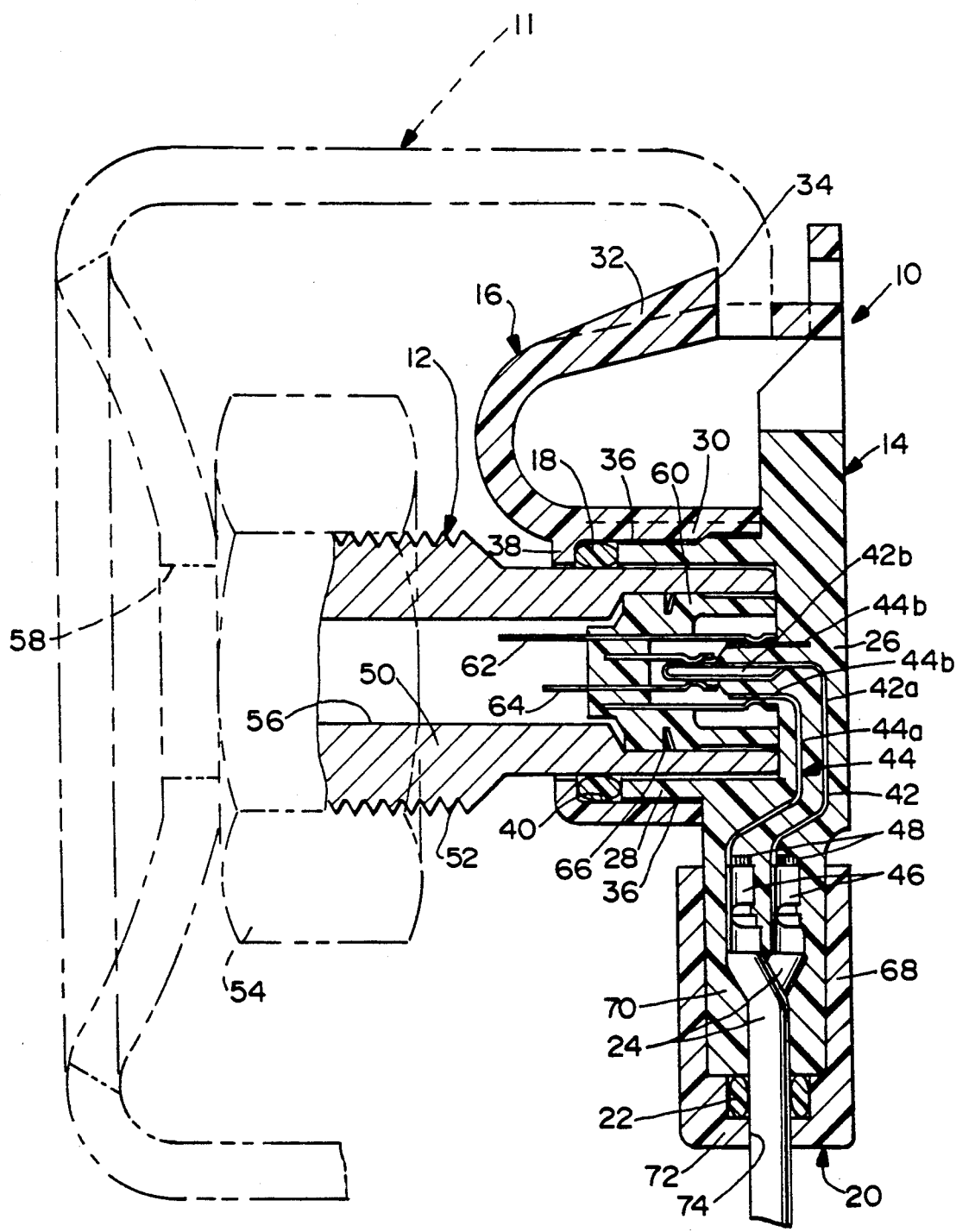

ELECTRICAL CONNECTOR SYSTEM

This is a continuation of copending application Ser. No. 07/668,643 filed on Mar. 13, 1991 now abandoned.

FIELD OF THE INVENTION

This invention generally relates to the art of electrical connectors and, particularly, to an electrical connector system for adjustable automotive suspension components.

BACKGROUND OF THE INVENTION

Electrical connectors are provided for transferring power and other electrical signals from a remote control unit to a plurality of adjustable automotive suspension components, such as electrically adjustable hydraulic struts and shock absorbers. Low-voltage, low-current electronic information is transferred between the electrically adjustable shock absorbers and the electronic control unit by means of an electrical harness.

It can be understood that such electrical connector systems which are located under an automobile hood or in a wheel well are subject to rather harsh environments, such as including high vibration, impact, severe moisture and salt conditions.

Heretofore, problems inherent with such electrical connector systems have been solved by providing relatively complex connectors, including a relatively large number of components, bulky coaxial connecting components, numbers of seals to protect against the environment, polarization features and the like. Such complex connectors are not cost-effective in assembly and are difficult to service in use. An example of an electrical connector system for adjustable automotive suspension components is shown in U.S. Pat. No. 4,789,343 to Dougherty et al., dated Dec. 6, 1988.

There is a definite need for an electrical connector system of the character described which is very simple, cost-effective and yet solves the problems encountered in the harsh environments of such connector systems. This invention is directed to satisfying that need.

SUMMARY OF THE INVENTION

An object, therefore, of the invention is to provide a new and improved electrical connector assembly which is readily applicable for connecting an electronic control system to an adjustable automotive suspension component.

In the exemplary embodiment of the invention, the assembly includes a dielectric housing having terminals thereon for connection to appropriate mating terminals on the suspension component. A separate dielectric latching means is provided for latching the electrical connector assembly to complementary latch means on the suspension component. The separate latching means is ultrasonically welded to the dielectric housing. By fabricating the housing and latching means separately of dielectric material and ultrasonically welding the two components together, much simpler cost-effective molding techniques can be used, and extraneous latching hardware and seals are eliminated.

In the preferred embodiment, the dielectric housing is molded with a generally cylindrical receptacle for receiving an appropriate plug on the suspension component. The latching means has a generally cylindrical shroud telescoped over and ultrasonically welded to the receptacle. The cylindrical shroud has a concentric opening through which the plug of the suspension component can be inserted into the receptacle.

The invention contemplates that the dielectric housing be a molded plastic component, and the terminals are insert molded in the housing, with contact portions exposed in the housing receptacle. Usually, two terminals are required. The invention contemplates that one terminal has a cylindrical contact portion and the other terminal has a pin contact portion coaxially disposed within the cylindrical contact portion, thereby eliminating the need for polarizing means predominant with prior art connectors of the character described.

By insert molding the terminals in the molded housing, no seals are needed to protect the terminals. The terminals are terminated to respective electrical wires, and the areas of termination therebetween are surrounded by the plastic material of the molded housing, eliminating further seals to protect the electrical terminations.

Still further, the invention contemplates that the dielectric housing include a base with the integral receptacle projecting from the base. The terminals are generally L-shaped with one leg of each L-shaped terminal terminated to a respective electrical wire and the other leg of each L-shaped terminal defining its contact portion extending into the receptacle. Therefore, the connector assembly has a very compact, low profile, contrary to the bulky coaxial connectors dominant in the prior art.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is an exploded perspective view of an electrical connector assembly incorporating the concepts of the invention, in conjunction with a component of an adjustable automotive suspension system;

FIG. 2 is a perspective view of the electrical connector assembly in assembled condition, as looking toward the right-hand end of the exploded depiction of FIG. 1; and FIG. 3 is a section taken generally along right-angled line 3—3 of FIG. 2, and including the suspension component shown at the left-hand end of FIG. 1.

DETAILED DESCRIPTION

Referring to the drawings in greater detail, and first to FIG. 1, the invention is disclosed herein in the form of an electrical connector assembly, generally designated 10, for electrical connection to a mating electrical connector assembly, generally designated 12, attached to a suspension component, shown in phantom and generally designated 11, of an adjustable automotive suspension system.

Connector assembly 10 includes a dielectric housing, generally designated 14, a separate dielectric latching means, generally designated 16, an O-ring seal 18 (mounted in the interior of housing 14 and latching means 16 when assembled); and a wire retainer, generally designated 20, with a pair of ring seals 22 surrounding a pair of electrical wires 24 which are terminated in the connector. Dielectric housing 14 and the separate dielectric latching means 16 are the primary components of the invention which house terminals therewithin, as described hereinafter. Each of the housing and latching is fabricated unitarily of molded plastic material, as is retainer 20.

FIG. 2 shows dielectric housing 14, latching means 16, O-ring 18, retainer 20 and ring seals 22 in assembled condition, as looking toward the right-hand end of the exploded depiction of FIG. 1.

Referring to FIG. 3 in conjunction with FIGS. 1 and 2, dielectric housing 14 includes a base 26 and an integral receptacle 28. Base 26 is generally flat, and receptacle 28 is generally cylindrical and projects from the base generally at a right-angle thereto.

Latching means 16 includes a generally cylindrical shroud 30 having a pair of arched latch arms 32 integrally molded with the shroud and projecting outwardly from opposite sides thereof whereby the latch arms are self-spring loaded. Each latch arm 32 has an outwardly projecting hook portion 34 for snapping engagement with suspension component 11, as described hereinafter. Cylindrical shroud 30 is sized to telescope over receptacle 28 of housing 14 and is ultrasonically welded thereto, as at 36 (FIG. 3), during manufacturing assembly of the connector. The ultrasonic weld forms a continuous ring about receptacle 28, between the receptacle and shroud 30, and seals the two components as if they originally would have been integrally molded by a much more complex and expensive molding procedure and tooling.

It can be seen in FIG. 3 that shroud 30 has an inturned circular flange 38, and the length of receptacle 28 is shorter than the length of the shroud, whereby a groove 40 is formed therebetween for receiving O-ring seal 18. The seal is provided for sealing engagement about mating connector 12 when the connector is inserted into receptacle 28 of housing 14.

As stated in the Background, above, electrical connector assembly 10 is provided for transferring power and other electrical signals from a remote control unit (not shown) to the adjustable automotive suspension system. Conventional electronic control means, therefore, incorporate a pair of electrical wires 24 of an electrical harness leading back to the remote control unit. Electrical connector assembly 10 includes a pair of terminals, generally designated 42 and 44 in FIG. 3. Each terminal is electrically connected, as by crimping portions 46, to exposed conductors 48 of wires 24.

Each terminal 42 and 44 is generally L-shaped. Specifically, terminal 44 has one leg 44a crimped to its respective electrical wire 24, and another leg 44b forming a contact portion of the terminal. Likewise, terminal 42 has one leg 42a crimped to its respective electrical wire and another leg 42b forming a contact portion of the terminal. Contact portion 44b of terminal 44 is generally cylindrically shaped, and contact portion 42b of terminal 42 forms a pin contact coaxially disposed within cylindrical contact 44b. This concentric configuration of the contact portions obviates any polarization features in the mating connectors. The general L-shape of the terminals is complementary to the general shape of flat base 26 and receptacle 28 of housing 14 and provides a compact, low profile configuration of connector assembly 10 contrary to the coaxial configurations of prior art connector assemblies of this type.

As can be seen in FIG. 3, the invention contemplates that terminals 42 and 44 be insert molded in the molded plastic material of housing 14, with the distal end of contact 42b projecting beyond the molded material, and the outside surface of cylindrical contact 44b being exposed outside the material, for mating with contacts of mating connector assembly 12, as described below. It also can be seen that the termination areas between terminals 42 and 44 with wires 24 (i.e., the crimp connections 46 onto conductors 48) are surrounded by the molded plastic material of housing 14. Consequently, not only are the terminals substantially protected from harsh environments, but the connections between the terminals and the electrical wires also are protected, completely eliminating many of the seals of the prior art.

Still referring to FIG. 3, mating connector assembly 12 includes a simple, generally cylindrical housing 50 which forms a plug for insertion into receptacle 28 of housing 14 of connector assembly 10. As can be seen, O-ring seal 18 seals about the outer cylindrical surface of housing 50.

Housing 50 of mating connector assembly 12 has an external thread 52. As shown in phantom, suspension component 11 has an internally threaded a nut 54 fixed thereto. The nut is internally threaded. Therefore, housing 50 of mating connector 12 simply is threaded into fixed nut 54. Housing 50 has an internal bore 56 coaxial with a hole 58 in suspension component 11 and through which electrical lead wires (not shown) can be inserted. The electrical wires lead to electrically operated devices within the suspension system to control the suspension system, as is known in the art.

A molded dielectric boss or plug 60 is inserted into the cylindrical distal end of housing 50 of mating connector assembly 12 and carries a pair of cylindrical contacts 62 and 64. The contacts are insert molded in boss 60 and form female contacts of mating connector 12. Specifically, outer cylindrical female contact 62 is sized and shaped for telescoping over cylindrical contact portion 44b of terminal 44. Inner cylindrical female contact 64 is concentric with outer contact 62 and is sized and shaped for telescoping over pin contact 42b of terminal 42. Boss 60 is assembled to and fixed within the inside of cylindrical housing 50, as at 62, by appropriate means such as an angled friction ring which allows for easy insertion but biases against removal.

Lastly, retainer 20 is shown in FIG. 3 to be generally cup-shaped with side walls 68 surrounding a laterally projecting portion 70 of housing 14, and a bottom wall 72 having an aperture through which wires 24 are inserted. Ring seal 22 surround the respective wires 24, and retainer 20 may be used to further support wires 24. As can be seen in FIG. 1, projecting portion 72 of housing 14 has a pair of snap detents 76 on opposite sides thereof for snapping into appropriate detent recesses (not visible in the drawing) formed on the inside of walls 68 of the retainer to snap-fit the retainer onto housing portion 70.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An electrical connector assembly for connecting an electronic control system to an adjustable automotive suspension component, comprising:

a dielectric housing having terminals for connection to appropriate mating terminals on the suspension component;

a separate dielectric latching means for latching the electrical connector assembly to appropriate complementary latch means on the suspension component, the separate latching means being ultrasonically welded to the dielectric housing;

the dielectric housing having a receptacle portion for receiving an appropriate plug of the suspension component, and said latching means having a shroud portion for embracing the receptacle portion of the dielectric housing, the shroud portion being ultrasonically welded to the receptacle portion; and wherein said receptacle portion and said shroud portion are generally cylindrical, said receptacle portion is shorter than said shroud portion with the shroud portion telescoped over the receptacle portion said shroud portion having an in-turned circular flange, said flange and said receptacle forming a groove for accommodating an O-ring seal.

2. The electrical connector assembly of claim 1 wherein said cylindrical shroud portion has an opening concentric with an opening in the receptacle and located in front of the opening in the receptacle through which the plug of the suspension component can be inserted into said receptacle portion and wherein said O-ring seal contacts said plug establishing a seal between said plug and said shroud.

3. The electrical connector assembly of claim 1 wherein said dielectric housing comprises a molded plastic component, and said terminals are insert molded in the housing, with contact portions of the terminals exposed exteriorly of the housing, one terminal having a cylindrical contact portion and the other terminal having a pin contact portion coaxially disposed within the cylindrical contact portion.

4. The electrical connector assembly of claim 3 wherein said terminals are terminated to respective electrical wires and the areas of termination therebetween are surrounded by the plastic material of the molded housing.

5. The electrical connector assembly of claim 3 wherein said dielectric housing includes a base and an integral receptacle projecting from the base, said terminals are generally L-shaped with one leg of each L-shaped terminal completely insert molded in the base and another leg of each L-shaped terminal defining its contact portion extending into said receptacle.

6. The electrical connector assembly of claim 5 wherein said one leg of each L-shaped terminal is terminated to an electrical wire and the area of termination is surrounded by the plastic material of the molded housing.

* * * * *